United States Patent [19]
Conant, III

[11] Patent Number: 5,890,664
[45] Date of Patent: Apr. 6, 1999

[54] TRANSPORTABLE, SELF-CONTAINED, FULLY AUTOMATED COMPOSTER

[76] Inventor: Jess Austin Conant, III, 424 W. McKellips Rd., Apache Junction, Ariz. 85220

[21] Appl. No.: 898,483

[22] Filed: Jul. 22, 1997

[51] Int. Cl.$^6$ .................................................. B02C 17/10
[52] U.S. Cl. ........................ 241/33; 241/101.76; 241/38; 241/57; 241/299
[58] Field of Search ............................... 241/33, 57, 299, 241/38, 65, 101.76, 172, 74, 79.3; 220/253

[56] References Cited

U.S. PATENT DOCUMENTS

| | | | |
|---|---|---|---|
| 696,396 | 4/1902 | Avery | 241/57 |
| 705,870 | 7/1902 | Sanders | 241/38 |
| 2,954,285 | 9/1960 | Carlsson et al. | |
| 3,556,420 | 1/1971 | Brown et al. | 241/86 |
| 3,676,074 | 7/1972 | Shibayama et al. | |
| 3,764,258 | 10/1973 | Brandt | 432/107 |
| 3,845,939 | 11/1974 | Waldenville | 259/10 |
| 3,850,364 | 11/1974 | Robbins | 241/51 |
| 3,930,799 | 1/1976 | Eweson | 23/259.1 |
| 4,047,672 | 9/1977 | Volkov et al. | 241/65 X |
| 4,204,959 | 5/1980 | Kreuzburge et al. | 210/195.1 |
| 4,411,682 | 10/1983 | Brill | 71/9 |
| 5,016,827 | 5/1991 | Didion | 241/79.3 |
| 5,049,486 | 9/1991 | Blackwood et al. | 435/3 |
| 5,118,043 | 6/1992 | Marklund et al. | 241/79.3 X |
| 5,169,782 | 12/1992 | Murphy et al. | 435/312 |
| 5,402,921 | 4/1995 | Forsyth et al. | 220/253 X |
| 5,704,557 | 1/1998 | Hallett et al. | 241/65 X |

OTHER PUBLICATIONS

C. Eccles et al., Microcomputers Monitor Static Pile Performance, *BioCycle*, 42–45 (Jan., 1987).
E.E. Fabian et al., Agricultural Composting: A Feasibility Study for New York Farms, *Cornell Composting*, 1–33 (Feb., 1993).

*Primary Examiner*—Joseph J. Hail, III
*Assistant Examiner*—William Hong
*Attorney, Agent, or Firm*—Richard R. Mybeck; Peter B. Scull

[57] ABSTRACT

The present invention is directed to an automated composting apparatus which includes a rotatable drum assembly mounted to a chassis which is adapted to provide wheeled transportability for the entire composting apparatus. Automation is provided primarily by a feedback control system having at least one sensor disposed inside the rotatable drum assembly, and being disposed to control the temperature and flow of air and/or water into the composting materials disposed in the rotatable drum assembly. The interior of the rotatable drum assembly has several unique features including a plurality of stationary dispensers mounted to a stationary, substantially hollow axle. The dispensers are adapted to disperse air and/or water into the compost material as the compost material is moved in and through the rotatable drum assembly. The drum assembly also has disposed therein, one or more elongated stripper elements which are each fixed at one end to the interior surface of the rotating drum and at the other end to a bearing member. Each bearing member is disposed on and rotates around the stationary axle. A unique spiral or semi-spiraled feed vane is also attached to the inner surface of the rotating drum to move the compost material in and through the rotating drum.

20 Claims, 7 Drawing Sheets

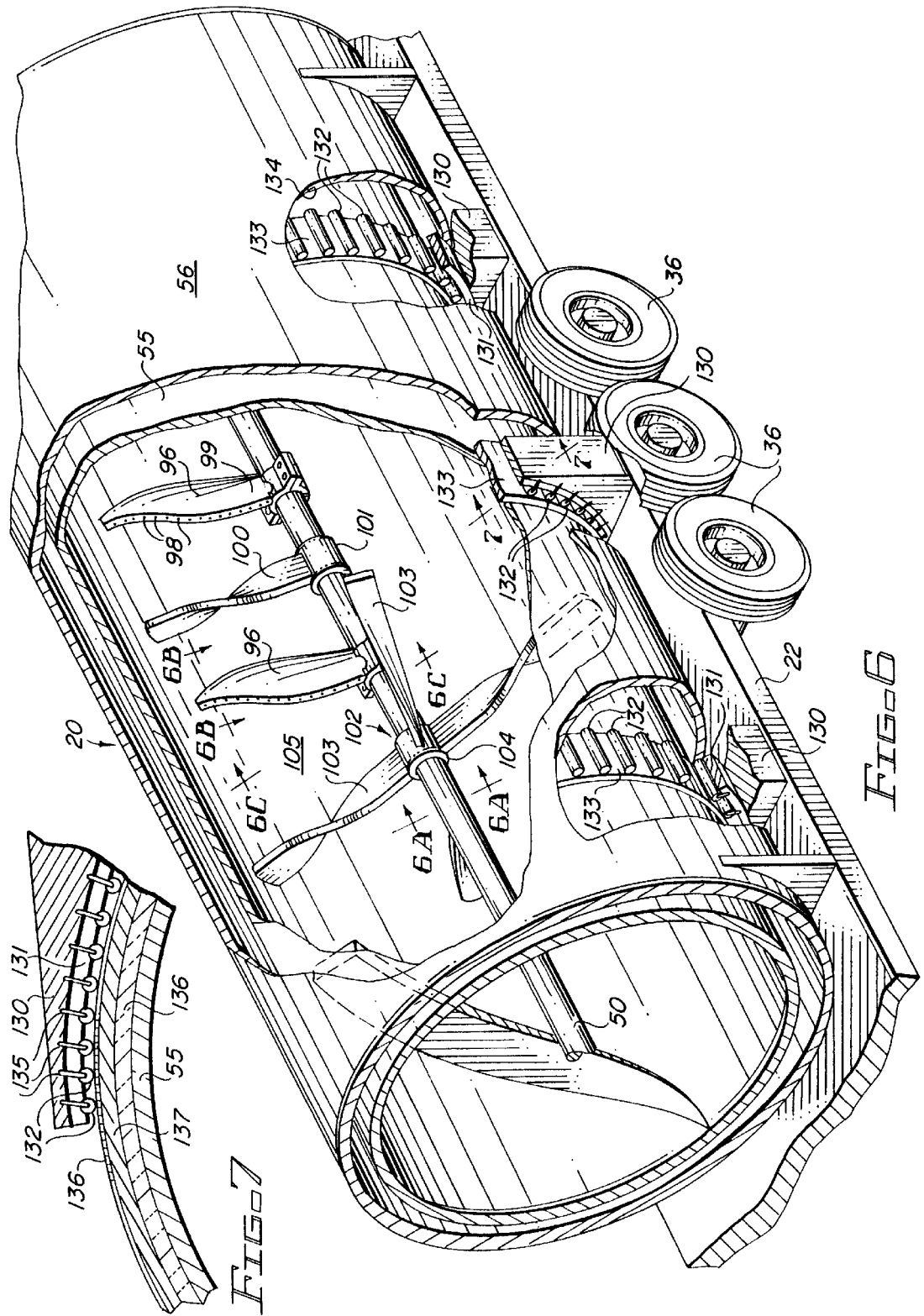

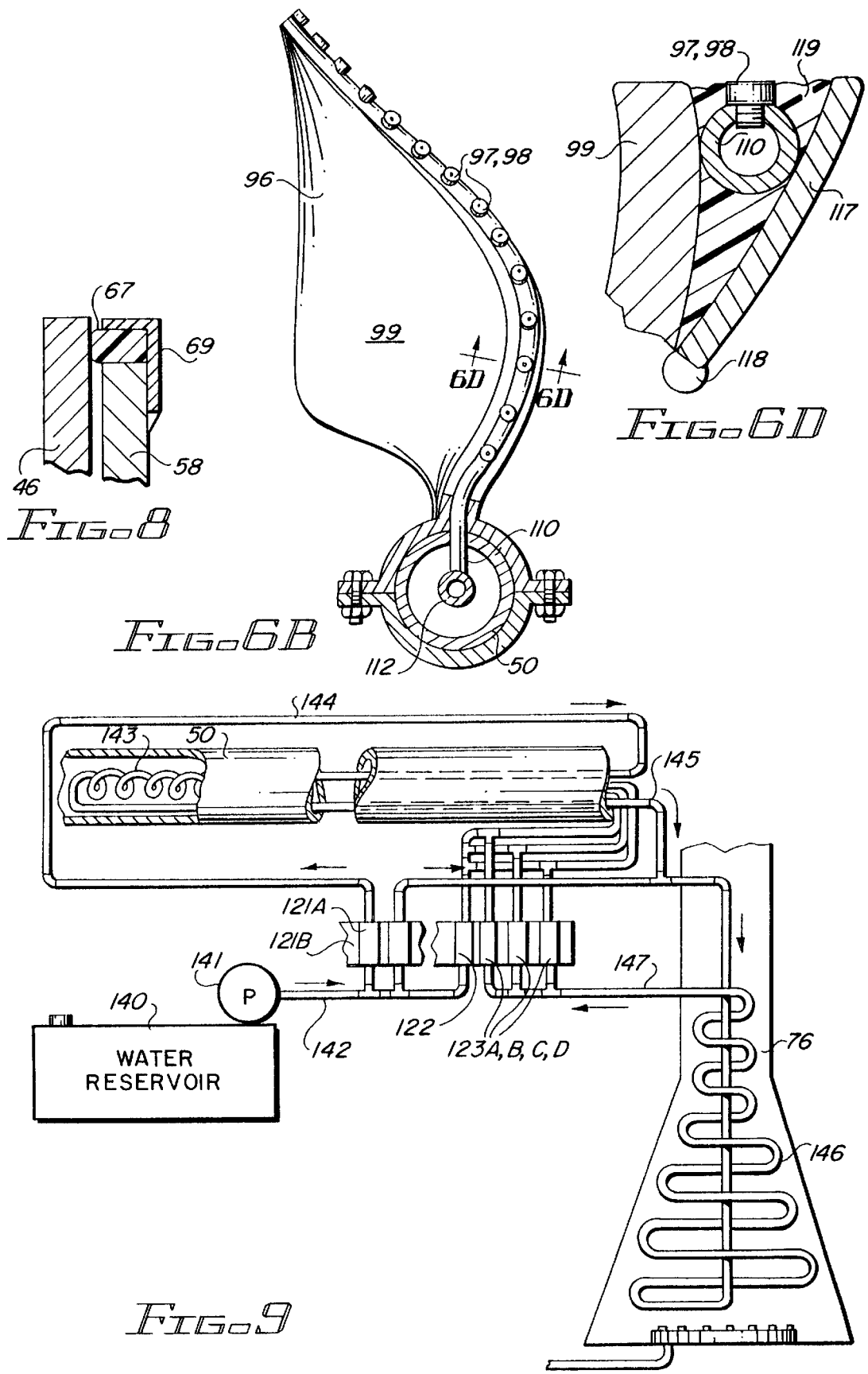

TRANSPORTABLE, SELF-CONTAINED, FULLY AUTOMATED COMPOSTER

The present invention relates generally to the art of composting and more particularly to a composter which may be readily transported from one location to another, and which has all necessary composting components as well as the compost material contained within one rotating unit. The composter of the present invention is also preferably automatically controlled in its composting processes by sensors and other feedback devices communicating with a computer which controls heat, aeration and moisture levels in the compost material.

BACKGROUND OF THE INVENTION

Composting is a process which generally provides two major benefits. It provides a method for handling organic waste materials so that these materials need not be disposed of in landfills, incinerators or in other non-environmentally beneficial disposal facilities. Furthermore, composting produces end materials, also known as the finished compost, which is highly regarded for its ability to improve soils and enhance plant growth. See: E. Fabian, et al. "Agricultural Composting: A Feasibility Study for New York Farms, a Staff Report from Cornell Composting" (February, 1993).

However, most traditional methods of composting suffer considerable drawbacks. Composting in windows, piles, pits or vaults necessitates the usage of considerable time and real estate. Large machinery is then also necessary to turn the composting materials in order to aerate the materials. Compaction is yet another problem with these methods. Thorough decomposition of the compost materials requires maintenance of proper levels of moisture, heat and aeration in the mass throughout the process. Compost materials which are simply stacked in stationary windrows, piles or pits do not permit accurate maintenance of these critical conditions throughout the mass of composting materials.

There have been attempts to address these conditions in the past. For instance, several persons have proposed rotating cylindrical composting apparatuses to avoid compaction and remove the need for large machinery to turn the composting material. See e.g., Carlsson et al. (U.S. Pat. No. 2,954,285); Shibayama et al. (U.S. Pat. No. 3,676,074); Eweson (U.S. Pat. No. 3,930,799); Kreuzburg et al. (U.S. Pat. No. 4,204,959); and Murphy et al. (U.S. Pat. No. 5,169,782); among others.

Moreover, the movement of rotatable cutting and scraping elements through composting material to agitate these materials and keep them from compacting have also been attempted. See e.g., Brown (U.S. Pat. No. 3,556,420); Waldenville (U.S. Pat. No. 3,845,939); Robbins (U.S. Pat. No. 3,850,364) and Brill (U.S. Pat. No. 4,411,682). However, in each of these examples the cutters and scrapers are fixed to a rotating shaft mounted within a stationary cylindrical drum.

Furthermore, some of those previous composting apparatuses which have had rotating drums as parts of their assemblies have also taught the affixation of various elements to the interior surfaces of the rotating drums for the purpose of, inter alia, agitating and lifting and moving the mass of composing materials along the length of the rotating drum. For example, Murphy, ibid, disclosed longitudinal vanes; Shibayama, ibid, taught lifting cross pieces and Kreuzburg, ibid, taught partition walls. Also, Eweson taught the attachment of knives and chains to the interior surface of a rotating drum to cut, shred, crush and grind composting materials moving therethrough.

Still further, limited computerized composting controls have been introduced in Waldenville, ibid, Blackwood et al. (U.S. Pat. No. 5,049,486) and C. Eccles et al., "Controlled Composting, Microcomputers Monitor Static Pile Performance," BioCycle (January 1987). These have all three been generally directed to time and/or temperature measurements and control of non-rotating drum composting environments.

However, even in view of these prior apparatuses, there remains a need for a composting apparatus which provides satisfactory control over the amounts of aeration, moisture and heat present throughout a mass of moving composting materials. It is toward the satisfaction of this need that the present invention is directed.

BRIEF SUMMARY OF THE INVENTION

The present invention is directed to a composting apparatus which includes a rotatable drum mounted to a chassis which is adapted to provide wheeled transportability for the entire composting apparatus. The interior of the rotatable drum has several unique features including a plurality of stationary dispensers mounted to a stationary, substantially hollow axle. The dispensers are adapted to disperse air and/or water into the compost material as the compost material is moved in and through the rotatable drum. The rotatable drum also has disposed therein, one or more elongated stripper elements, each of which is affixed at one end thereof to the interior surface of the rotating drum and at the other end to a bearing member. Each bearing member is disposed on and rotates around the stationary axle. A spiral or semi-spiraled feed vane is also attached to the inner surface of the rotating drum and extends generally normal therefrom to move the compost material in and through the rotating drum.

The composting apparatus of the present invention also includes a computer control system which senses and controls the amount of heat, aeration and moisture present in the rotating mass of compost material inside the rotatable drum throughout the composting process. The computer control system receives feedback data from sensors disposed on certain dispensers within the rotatable drum. The computer then processes this feedback data to determine how much heating, cooling, air and/or moisture is needed within the mass of compost materials at particular positions therewithin and initiates the injection of heated or unheated water and/or heated or unheated air into the compost material at the desired locations in the desired amounts to achieve optimum composting conditions throughout the mass.

Accordingly, a primary object of the present invention is to provide a novel and unique composting apparatus which has the ability to produce finished materials in a faster, more efficient and cost effective manner.

Another object is to provide a transportable, self-contained, fully automated composting apparatus having a plurality of air and water dispensers disposed within the composting apparatus which are capable of providing a more accurate environmental control within the composting materials.

Yet another object is to improve agitation and movement of composting materials through a composting apparatus.

Still another object of the present invention is to provide for operation controls that dispense air and/or water at proper temperatures into a moving mass of composting materials to achieve total or near total decomposition thereof in a relatively short period of time.

A still further object is to provide a composting apparatus having improved mobility.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 1A is a fragmented view of that portion of the composting apparatus of FIG. 1 labelled 1A, shown partially in section;

FIGS. 5A, 5B, and 5C are cross-sectional views of the inner and outer drums of the apparatus of the present invention taken from the inlet end shown at three different times during an operational rotation of 180°.

FIG. 6 is a break-away, partially fragmented isometric view of the inner and outer drums of a composting apparatus embodying the present invention;

FIG. 6C is a elevational view of an air/water dispenser of the present invention taken on line 6C—6C of FIG. 6;

FIG. 6D is a cross-sectional view of a portion of an air/water dispenser of the present invention taken on line 6D—6D of FIG. 6C;

FIG. 7 is a fragmented cross-sectional view of the apparatus interface between the inner drum and a roller support member taken of line 7—7 of FIG. 6;

FIG. 8 is an enlarged view of that portion of the sectional area labelled 8 in FIG. 4;

FIG. 9 is a schematic view of the water system of the present invention;

DESCRIPTION OF THE PREFERRED EMBODIMENT

Figure 1:
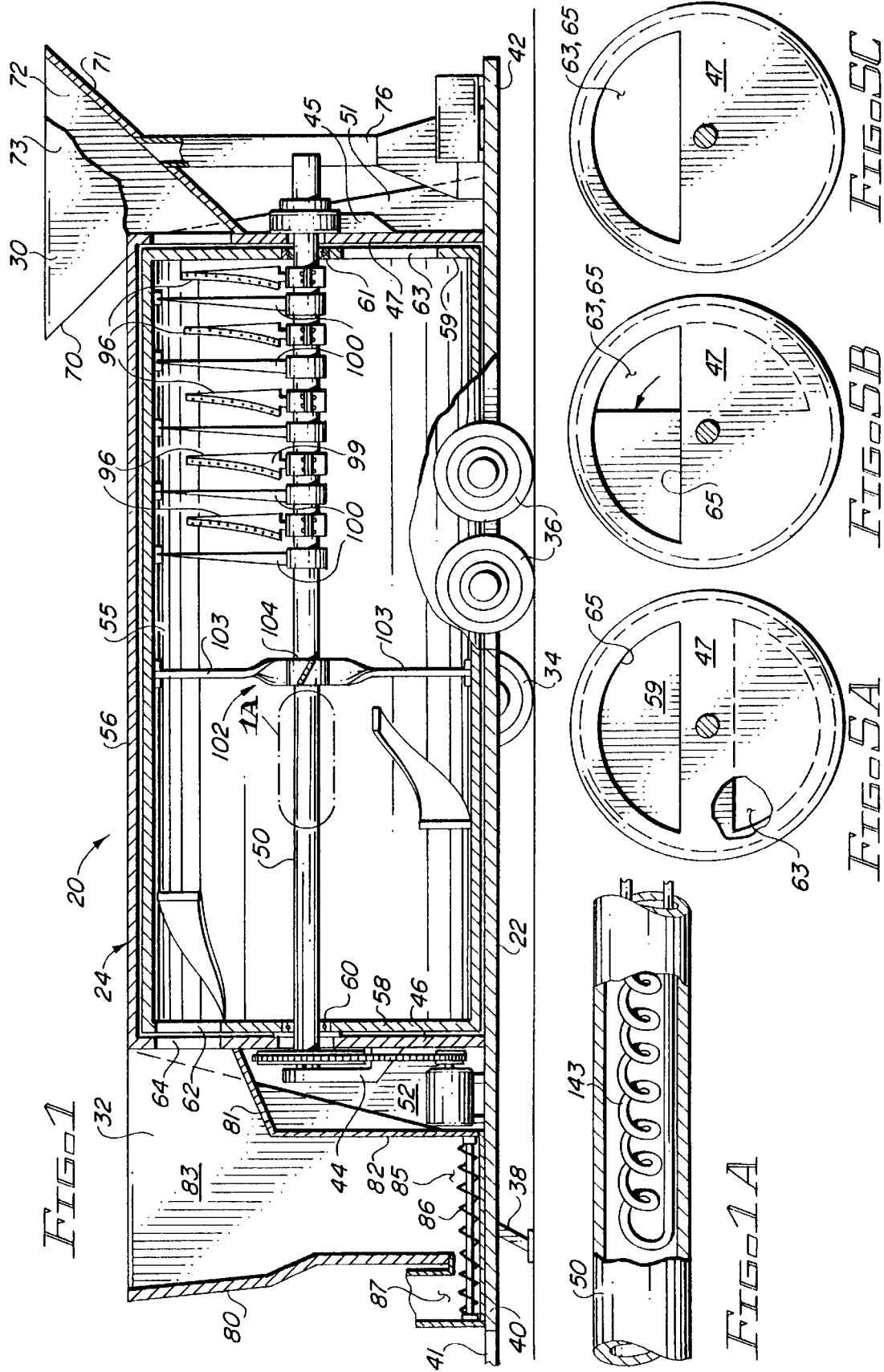
FIG. 1 is a side elevation, partially in cross-section, of a composting apparatus embodying the present invention.

A composting apparatus of the present invention is shown in the attached drawings and identified by the general reference numeral 20. As shown for example in FIG. 1, composter 20 generally comprises a chassis 22 on which is disposed a rotatable drum assembly 24. Assembly 24 has an inlet end 26 and an outlet end 28. Raw compost material is fed into assembly 24 via a feed hopper 30 at inlet end 26. Raw compost material is then composted inside assembly 24 until it turns into finished compost material which exits assembly 24 at outlet end 28 where it accumulates in discharge hopper 32.

The more specific structural elements of a composter 20 of the present invention will now be described. Chassis 22 is preferably supported by two or more corresponding wheels or sets of wheels 34, 36 on respective sides of chassis 22. Wheels 34, 36 preferably provide sufficient movable support for composter 20 to be transported on conventional roadways. Chassis 22 also has a support jack 38 disposed thereon to provide an elevating mechanism at or adjacent leading end 40 of chassis 22. Though not shown, and as will be described further below, support jack 38 preferably imparts a 5° incline to chassis 22 measured such that the angular vertex is disposed at trailing end 42 so that leading end 40 is elevated to be 5° higher off the ground than trailing end 42. A trailer hitch 41 or a like connecting mechanism is preferably disposed at leading end 40 to connect chassis 22 to a tractor, truck or other transportation power source to move composting apparatus 20 to a desired composting location.

Rotatable drum assembly 24 is disposed in a lengthwise position on chassis 22 between leading end 40 and trailing end 42 of chassis 22. Assembly 24 is held in operative position by the coaction of respective leading and trailing axle support mounts 44, 45, outer end plates 46, 47 and a stationary axle 50. Support mounts 44, 45 are preferably fixed at their respective lower ends to respective outer end plates 46 and 47 and at their upper ends they fixedly support the first and second ends of stationary axle 50. Stationary axle 50, as shown, extends in and through drum assembly 24 between supports 44,45. End plates 46, 47 are axle and drum support members which are preferably affixed at their lower ends to chassis 22 and are further supported in their upright positions by triangular gusset support members identified by representative gussets 51, 52 in FIG. 1. Two further gusset support members 53, 54 are shown in FIGS. 2 and 3.

Figure 2:
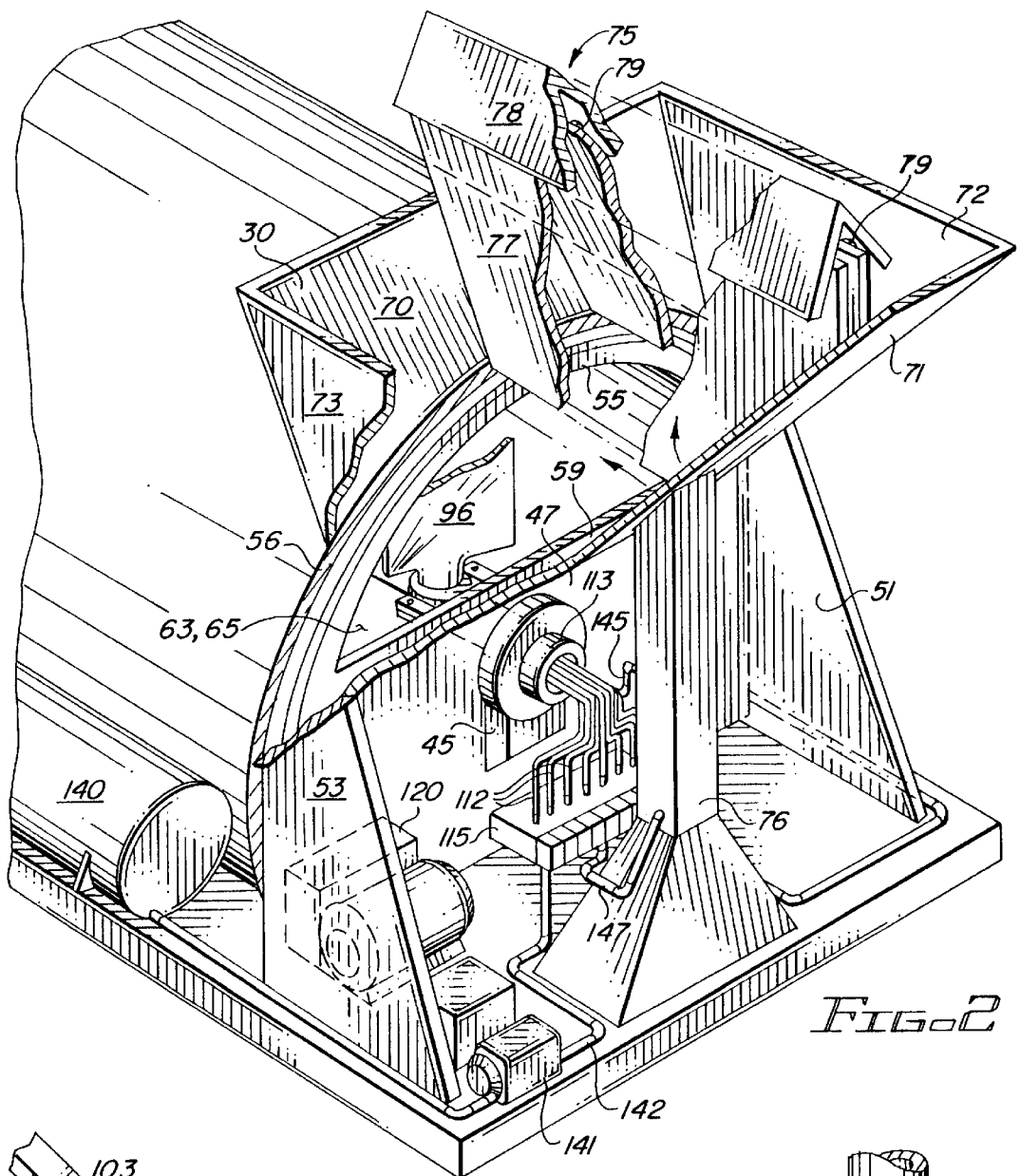
FIG. 2 is a partially fragmented isometric view of a broken-away portion of a composting apparatus of the present invention taken from the inlet end of the apparatus.
Figure 3:
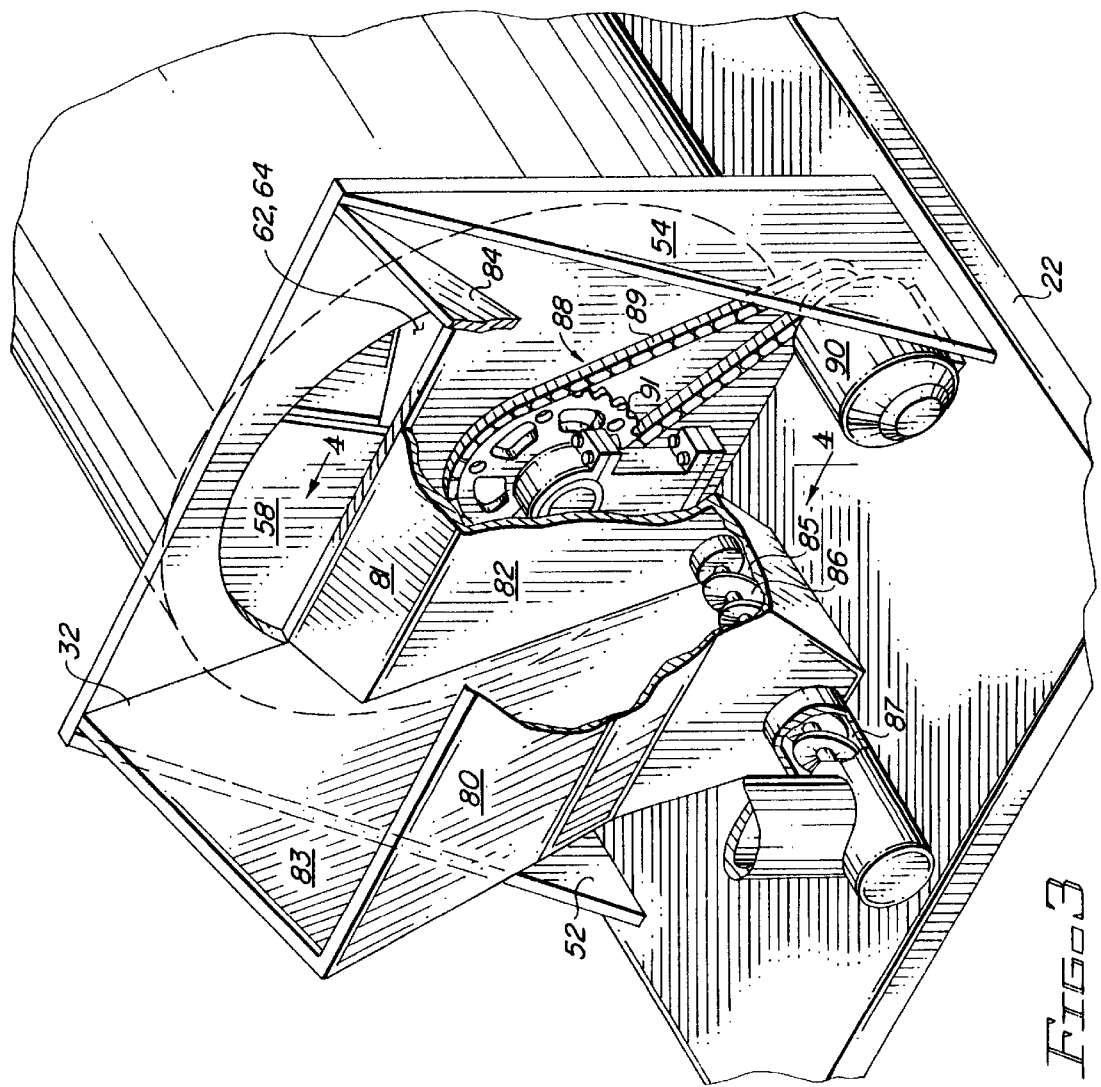
FIG. 3 is a partially fragmented isometric view of a broken-away portion of a composting apparatus of the present invention taken from the outlet end of the apparatus.

As can be seen in FIG. 1, but also in more detail in FIGS. 2, 3 and 6, rotatable drum assembly 24 preferably comprises an inner, rotatably movable vessel or drum 55 disposed within a fixed outer vessel or drum 56. Outer drum 56 thus necessarily has a wider inner diameter than the outer diameter of moving drum 55. Also, as will be described further below, at least one layer of insulation will preferably be disposed in the space between inner and outer drums 55, 56 and in the preferred embodiment this is fixed to the outer surface of inner drum 55.

Outer end plates 46, 47 are affixed to the longitudinal end edges of outer drum 56. Inner drum 55 also has attached thereto inner end plates which are identified in FIGS. 1–5 by the reference numerals 58, 59. Sufficient horizontal clearance (with the optional use of sealing devices therebetween) is provided between respective inner and outer end plates 46, 58 and 47, 59 so that inner drum 55 and end plates 58, 59 may freely rotate about axle 50. Indeed, inner drum 55 is primarily mounted in rotatable relationship about axle 50 by bearing members 60, 61 which are centrally disposed in or on end plates 58, 59 about axle 50. Note, bearings 60, 61 are primarily for maintaining the concentric alignment of drum 55 in relation to axle 50. For this reason, self-aligning bearings (as shown and described relative to FIG. 4, below) are preferred over fixed bearings like those shown for exemplary purposes in FIG. 1.

Also as shown in FIGS. 1–5, both ends of rotatable drum assembly 24 are alternately opened and closed by the coaction of openings defined in the corresponding sets of end plates 46, 58 and 47, 59. The openings or apertures defined in each of these end plates 46, 58 and 47, 59 is preferably half-moon-shaped. In particular, inner drum 55 has half-moon openings 62, 63 formed in its corresponding end plates 58, 59 and outer drum 56 has similar half-moon openings 64, 65 formed in plates 46, 47. The coaction of outer end plates 46, 47 with corresponding inner end plates 58, 59 serve to alternately open and then close off these openings to first, admit raw compost material through openings 63, 65 and then to disallow the escape of compost material out of rotating inner drum 55 during operation untilcomposting is completed when the finished compost material exits through corresponding openings 62, 64. As shown particularly in FIGS. 5A–5C, opening 63 in end plate 59 of inner drum 55 at the infeed end 26 (adjacent hopper 30) coacts with opening 65 in end plate 47 of outer drum 56 to alternately open and close access to the interior of inner drum 55. During each revolution of moving drum 55, opening 63 is also rotated such that at times it is completely out of alignment with opening 65 as shown in FIG. 5A so that the interior of inner drum 55 is closed off to external communication thereinto. Then, upon continued rotation as shown in FIG. 5B, opening 63 gradually moves toward alignment with opening 65 to create an increasing correlation and thereby also increasing the area of open communication there between into the interior of drum 55. Full open communication is eventually achieved as shown in FIG. 5C where the respective openings 63, 65 are in complete correspondence, i.e., where they are in congruent alignment. Continued rotation would then begin to close off this open communication by reduction of the area of correlation of the respective openings until the full closed position shown in FIG. 5A is again reached. The opening process (moving from FIG. 5A, to 5B and 5C) would then begin again.

The same process of opening and closing also takes place at the discharge end 28 of drum assembly 24. As drum 55 rotates, the relative positions of corresponding openings 62, 64 defined in the end plates of inner and outer drums 55, 56 at discharge end 28 similarly define the corresponding openness of communication from the interior of inner drum 55 out to discharge hopper 32. Full closure, partial openness and full openness are achieved in a fashion similar to that shown for inlet end 26 in FIGS. 5A–5C. Discharge openings 62, 64 are shown in FIGS. 1 and 3. However, as shown in FIG. 1, respective openings 62, 63 in inner drum 55 are preferably disposed at or about one hundred eighty degrees (180°) out of phase relative to each other. This then ensures that at all times there is always an open communication from the exterior of drum assembly 24 to the interior of inner drum 55 at either of the inlet or outlet ends 26, 28. This is desirable for purposes to be described further below.

As described generally above, a feed hopper 30 is mounted on drum assembly 24 at inlet end 26. As shown in FIGS. 1 and 2, hopper 30 preferably has at least a front wall 70 and a rear wall 71 which converge downwardly to openings 63, 65 at inlet end 26 in outer end plate 47 and inner end plate 59. Two side walls 72, 73 are preferably also included to completely surround the openings 63, 65 into drum 55. As shown in FIG. 2, feed hopper 30 may also be fitted with a chimney and hood structure which is identified generally by the reference numeral 75. Structure 75 is intended to provide passage for hot exhaust gases emanating from a heater 76 through the raw compost material disposed in hopper 30. Heat will preferably be transferred from the gases through the walls of chimney structure 75 to the raw compost material to preheat the material for composting. Structure 75 generally includes a preferably metal flue portion 77 to the top of which is connected a cowl or hood 78. Cowl 78 is attached in superposed, gas-flowing relationship above flue 77 by a plurality of U-shaped connectors 79 which are partially shown in FIG. 2. Exhaust gases may then escape from under the sides as well as from the longitudinal ends of cowl 78.

Also as described generally above, a discharge hopper 32 is mounted to chassis 22 at discharge outlet end 28 of drum assembly 24. As shown in FIGS. 1 and 3, hopper 32 has a front wall 80, a sloping upper rear wall 81 which is connected to a substantially vertical, lower rear wall 82 and two sloping side walls 83, 84. As shown best in FIG. 3, these walls are preferably disposed to converge down to a discharge area 85 which, as shown, has an optional rotatable discharge member or auger 86 disposed therein. Auger 86 is of a commercial type known in the art which will move the finished compost material to and out discharge port 87 to a gooseneck or other known discharge member (not shown) which feeds the finished material to a waiting truck or like receptacle (not shown).

Figure 4:
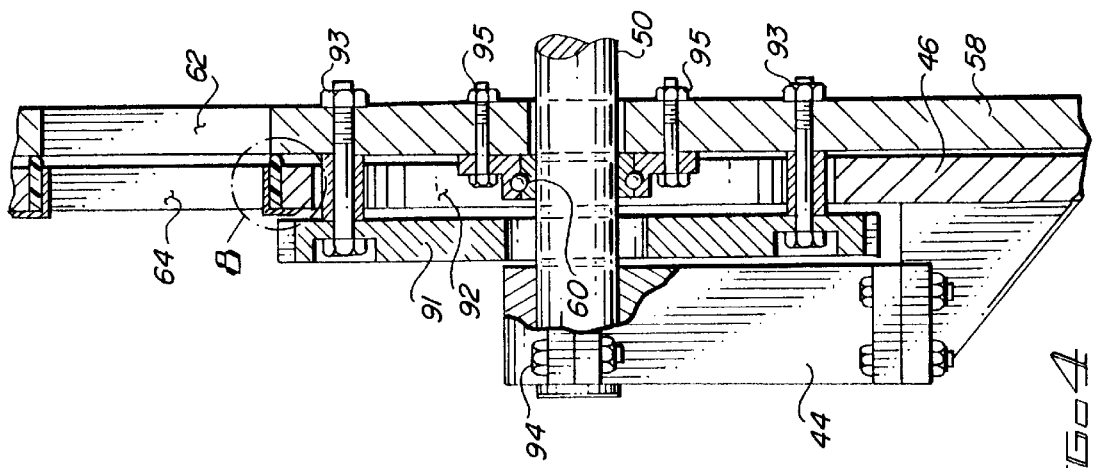
FIG. 4 is a cross-sectional view of a portion of the composting apparatus taken on line 4—4 of FIG. 3.

Also shown in more detail in FIG. 3 is a chain drive assembly 88 which is used to drive the rotating movement of inner drum 55. Chain drive assembly 88 generally includes a chain 89, a motor 90 and a large, toothed sprocket wheel 91 which is connected to plate 58 of inner drum 55. FIG. 4 shows a cross-sectional view of this connection (as well as a more detailed view of a bearing 60 connection to plate 58 as well as the connection of support member 44 to end plate 46 and axle 50). As shown, a large circular opening 92 is formed in external end plate 46 to provide access through plate 46 to plate 58 for connection of sprocket wheel 91 to plate 58. Nut and bolt connections 93 are shown making this connection. Note also that nut and bolt connections 94 and 95 are also shown in FIG. 4 as the preferred structures for making the respective connections of support member 44 to axle 50, and of bearing 60 to plate 58 as well. The gusseted, triangular lower portion of member 44 is preferably welded to the exterior surface of end plate 46.

An optional sealing device as shown generally in circled area 8 of FIG. 4 will now be described relative to FIG. 8. Note, FIG. 8 is a mirror image of the circled area 8 of FIG. 4. A sealing member 67 made of rubber, urethane or RTV may be used to seal around the half-moon openings in drum assembly 24. For example, half-moon opening 62 in plate 58 in drum 55 could be made slightly larger than corresponding opening 64 in drum 56 so that a sealing member 67 could be disposed on the edge 68 thereof. Then, a wave spring 66 is held in place by an L-shaped retaining member 69 which is welded at its lower end (as shown in FIG. 8) to plate 58. Spring 66 would then naturally force downward and inward on sealing member 67 to force it to contact plate 46 of outer drum 56. If so established around the circumference of opening 62, then an effective seal would be established between plates 58 and 46.

Moving now to FIGS. 1 and 6, several preferred internal features are also shown. First, a plurality of dispensers 96 are presented as these are disposed on stationary axle 50. Dispensers 96 are, as shown, preferably plow-shaped even though other shapes are foreseeably usable herein as well. Fluid movement shapes comprise some of the other, more desirable shapes including, for example, fan blades, air foils and air or water propellers. Also, as shown, dispensers 96 each have a plurality of discharge ports 97 and/or sensors 98 which are connected either to an air and/or water injection system or to a computer control system (none of which being shown in FIGS. 1 or 6 but which are to be described further below). A dispenser 96 which has only one or more sensors 98 disposed thereon and no discharge ports is more properly called a sensor support member. Such a support member would also preferably not have a tubing connection member connected to a valve or fluid supply source; although the sensor support member may have a tubular connection member in or on which the sensor or sensors 98 may be mounted. Thus, the electrical lead of a sensor 98 could be connected to the computer control system via the protective tubular connection member. The tubular connection member would then house the electrical lead and/or the sensor 98.

Several optional elongated stripper elements 100 are also shown in FIGS. 1 and 6. Each stripper element 100 is fixedly attached (as by bolting) at one end to the interior surface 105 of drum 55 and at the other end to a bearing member 101. Each bearing member 101 is disposed on and rotates around axle 50. Each stripper 100 is intended to continually agitate compost material so that it does not build up or accumulate within drum 55, and preferably, each stripper 100 has an approximate, but preferably less than a quarter twist formed therein to aid in moving the compost material through the interior of drum 55. This approximate quarter twist is shown better in FIG. 6 and preferably is disposed such that the stripper body is connected to bearing 101 at an approximate 45° angle relative to axle 50. The stripper body is then twisted through approximately 45° such that its outer end, as attached to drum surface 55, is roughly perpendicular to axle 50.

Still further, a combination stripper implement 102 is shown as preferably disposed in a substantially central longitudinal location within drum 55. Implement 102 has a plurality of stripper elements 103 which are connected to a bearing member 104 and are also fixed to the interior surface 105 of drum 55. Implement 102 is intended to fulfill the same or a similar purpose relative to that of each stripper 100; however, the combination implement 102, by its nature of having numerous preferably opposing lengths, also provides greater central support for both drum 55 and axle 50 in maintaining their concentric alignment relative to each other.

Figure 6A:
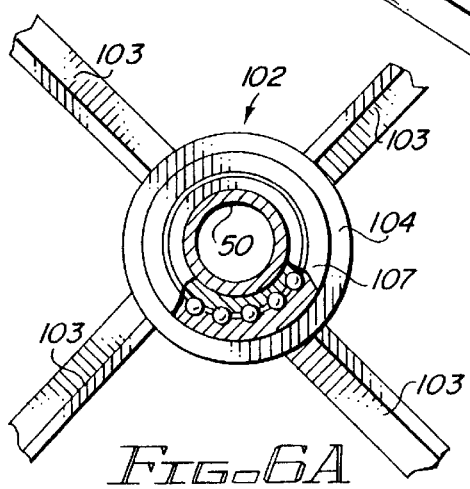
FIG. 6A is a fragmented cross-sectional view of the axle and a composite stripper implement of the present invention taken on line 6A—6A of FIG. 6.

Both sorts of strippers, stripper elements 100 and combination implement 102 are disposed to move with drum 55 in rotational movement around axle 50. Thus, stripper elements 100 and 103 are fixed at their outer ends to the interior surface 105 of drum 55 such that a rotation of drum 55 also causes the rotation of stripper elements 100 and 103. Thus, strippers 100 and 103 are in rotational contact with axle 50 through respective bearing members 101 and 104. Bearings 101 and 104 may be of roller, ball or any other suitable type which are preferably housed within doughnut-shaped member 107 which are wrapped around axle 50. This is best shown in FIG. 6A. Thus, each bearing member 101 and 104 remains in constant rotational contact with axle 50 about a continuous circumference thereof.

One yet still further preferred internal feature of apparatus 20 is a spirally-shaped feed vane 106 which is shown in FIGS. 1 and 6 as disposed inside drum 55. Feed vane 106 is preferably also fixedly attached to the inner surface 105 of drum 55. As such, feed vane 106 extends generally normal inward from surface 105 a preselected distance toward axle 50. It preferably does not extend all the way to nor contact axle 50. Feed vane 106 is preferably located in the outfeed half portion of drum 55 adjacent discharge end 28, and is of a semi-spiraled shape that preferably extends through a plurality of full circumferential coils within the outfeed half portion of drum 55. Vane 106 thus imparts a sort of Archimedean screw-type force on the compost material in urging the compost material toward outlet end 28 of drum 55.

As shown in more detail in FIGS. 2 and 6, dispensers 96 are firmly and stationarily fixed to stationary axle 50 such that they are preferably disposed in upright position with dispensing ports 97 generally facing discharge end 28 of drum assembly 24. Ports 97 do not, however, face directly toward discharge end 28, but rather are disposed angularly relative to axle 50 to disperse fluids in the direction of the flow of compost materials as moved therealong by dispensers 96 and/or strippers 100. Thus, the upwardly extending body portions 99 of dispensers 96 are also preferably angularly disposed relative to axle 50 such that ports 97 would spray air and/or water therefrom at a predefined angle relative to axle 50.

Figure 6B:
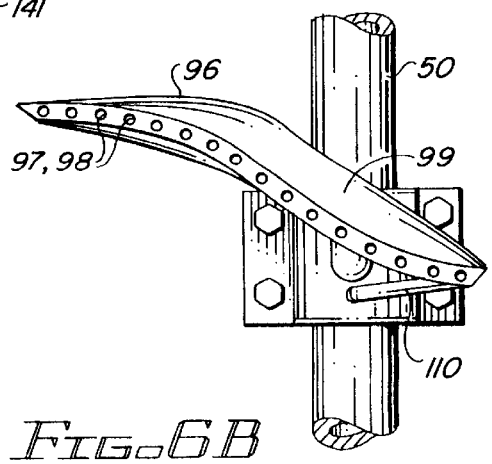
FIG. 6B is a partially fragmented plan view of an air/water dispenser of the present invention taken on line 6B—6B of FIG. 6.

As shown generally in FIGS. 6B and 6C, each dispenser 96 has a tubular connection member 110 disposed thereon. A single connection member 110 connects a tubular fluid supply member 112 to a plurality of discharge nozzles or ports 97, or, alternatively, to one or more sensors 98. Preferably, every alternate dispenser 96 down the length of axle 50 has either ports 97 for air and/or water or sensors 98. Thus, for example, the first dispenser 96 disposed nearest inlet end 26 adjacent feed hopper 30 has air and/or water discharge ports 97 disposed thereon. Then, the next dispenser 96 located immediately adjacent the first dispenser 96 has sensors 98 disposed thereon in lieu of air and/or water discharge ports 97. Hence, if five dispensers 96 are used as shown in FIG. 1, then the first, third and fifth dispensers numbered preferably right to left have ports 97 while the second and fourth dispensers disposed therebetween would have sensors 98. This provides a preferable separation between any given set of ports 97 and the nearest sensors 98 so that the sensors more accurately sense the actual composting conditions of the composting materials rather than the non-characteristic conditions immediately surrounding discharge ports 97. Each tubular member 112 runs through the hollow portion of axle 50 out inlet end 113 of axle 50 to a solenoid manifold 115 as shown in FIG. 2 or computer control system 120. The fluid and electrical systems will be described further below.

FIG. 6D shows the implantation of connection member 110 on a dispenser 96. In particular, each tubular connection member 110 whether containing either ports 97 or sensors 98 is preferably disposed between the body 99 of each dispenser 96 and a shroud 117 welded thereto as shown by weld 118. A potting material 119 such as RTV, urethane or BUNA rubber may be used to secure tubular connection member 110 therein. The connection of shroud 117 to dispenser 96 is preferably off the back side of dispenser 96 as shown still in line with the flow of compost material therepast to reduce stress thereon.

FIG. 6 shows some further details particularly regarding additional rotational support for drum 55. In particular, preferably three roller support structures 130 are disposed to provide a greater amount of weight carrying capacity than would be available if bearings 60, 61, 101 and 104 were to be used alone. Rather, bearings 60, 61, 101 and 104 are meant, preferably, not to be weight bearing but to maintain concentric alignment of drum 55 on axle 50 during rotation. The centrally disposed support structure 130 is shown in full whereas the two outer structures 130 are broken away to reveal further details as to the coaction with the rollers 132 disposed therein. As shown also in FIG. 7, structure 130 has a band 131 disposed therein which receives and operably holds a plurality of cylindrical rollers 132. Rollers 132 contact bands 133 disposed on and around drum 55 in rolling contact therewith. Bands 133 wrap all the way around drum 55; however, support members 130 with rollers 132 extend all the way underneath drum 55 but only part way up the sides of drum 55 to form a cradle support. Preferred cradle coverage includes preferably about 120° around the under portion of the circumference of drum 55. Measured from the bottommost point of the circumference of drum 55, rollers 132 would thus extend 60 radial degrees around the circumference an equal distance up both sides of drum 55. Three cutout portions 134 are formed in outer drum 56 to accommodate supports 130. Cutout portions 134 need not extend around the circumference of drums 56 but only sufficiently high to provide room for the 120° extensions of supports 130.

Moreover, FIG. 7 shows brackets 135 which are attached to cradle support structure 130 and hold rollers 132 therein. Other methods for holding rollers 132 in operative position within cradle structure 130 are known in the art and may also be substituted herein. FIG. 7 also shows an optional use of insulation 136 which is disposed on drum 55 and is covered with a securing layer 137. What is not completely shown in FIG. 7 is that band 133 is disposed in constant contact with both drum 55 and rollers 132. Thus, the radial thickness of band 133 extends from the exterior surface of drum 55 to rollers 132 and, as situated in FIG. 7, is an appreciable amount thicker than the combination of insulation 136 and covering layer 137. Thus, insulation 136 is disposed around drum 55 adjacent the lateral edges of bands 133 and is not disposed under bands 133.

The feedback control system will now be described. Though a computer 120 will be described as part of the preferred feedback control system of the present invention, it is foreseeable that devices not requiring an actual computer could be used, though possibly with sacrifices to simplicity in variability. Thus, for example, certain temperature or moisture sensors which have internally pre-ordained operating limits may be used to trigger relays or other circuit elements to open or close solenoid valves in manifold 115 in a manner similar to that to be described. Thus, a feedback control system utilizing a computer 120 will first be described with some attention to some foreseeable alternatives to be addressed later.

In referring to FIG. 2, the computer 120 is located outside the drum assembly 24 and is preferably located adjacent the piping manifold 115 which is disposed just below the open end 113 of axle 50 under feed hopper 30.

Figure 10:
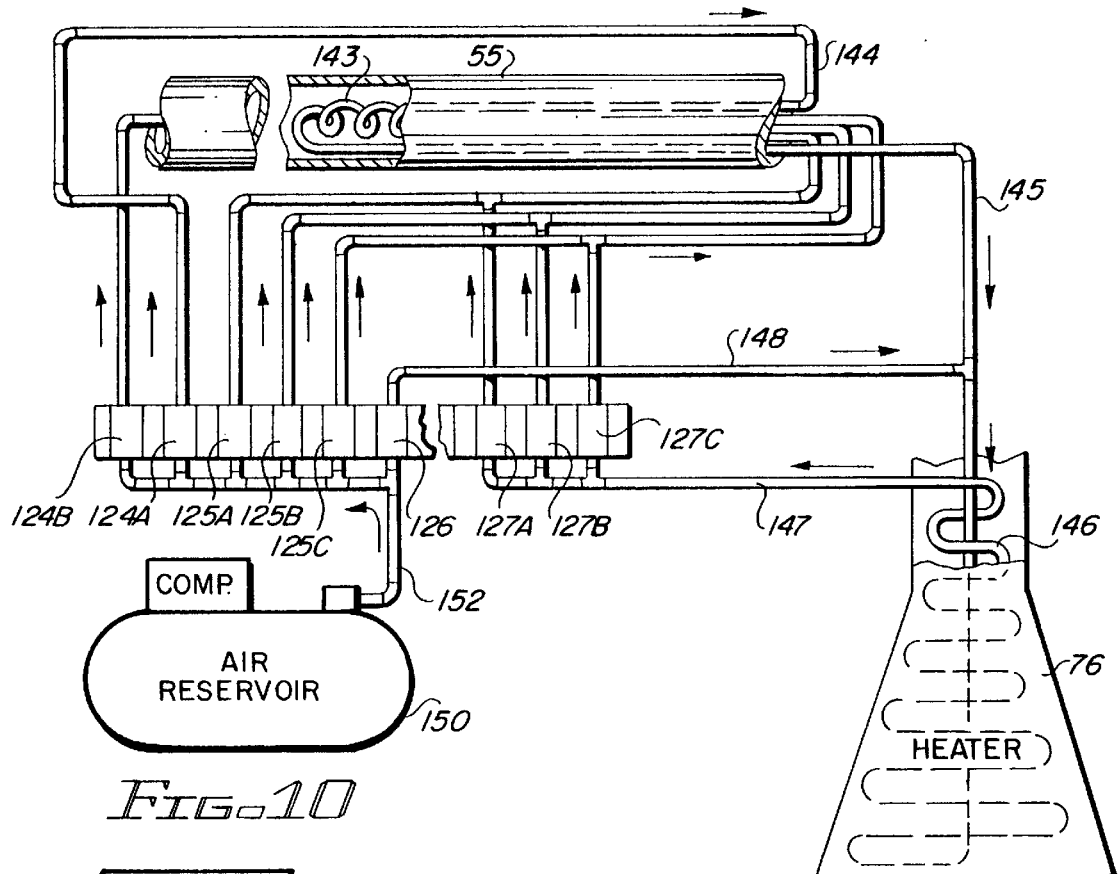
FIG. 10 is a schematic view of the air system of the present invention.
Figure 11:
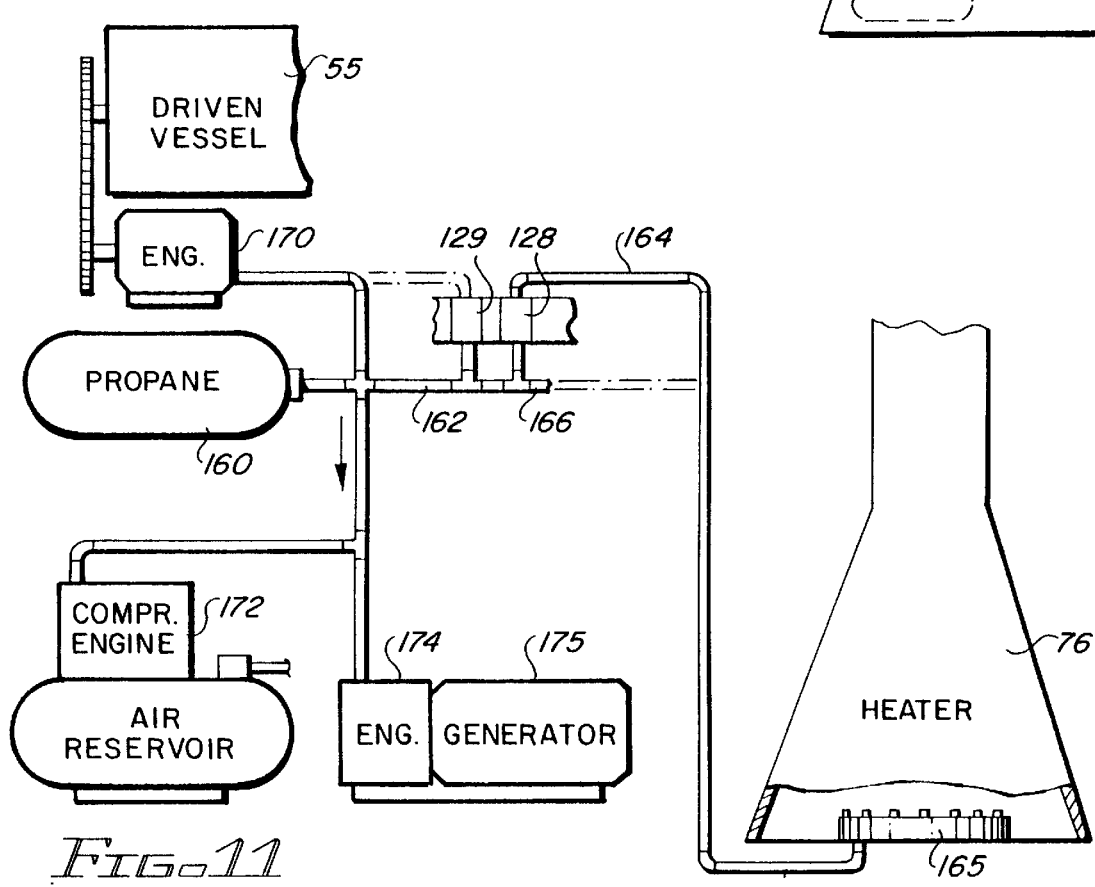
FIG. 11 is a schematic view of the propane system of the present invention.
Figure 12:
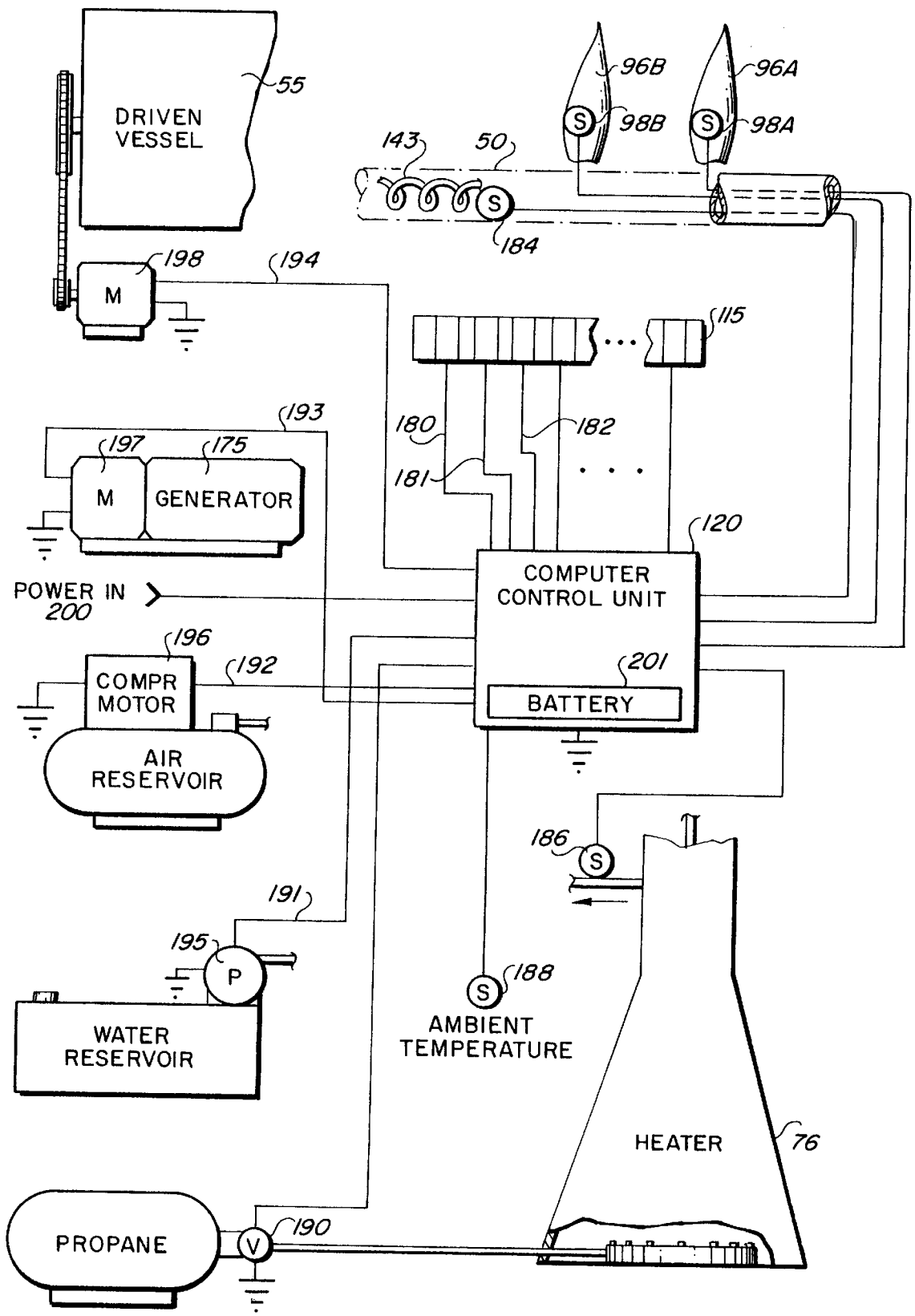
FIG. 12 is a schematic view of the electronic system of the present invention.

The feedback system actually controls several interrelated systems shown isolated in FIGS. 9–12. In FIG. 9, the water system is shown. FIG. 10 shows the air system. FIG. 11 shows the gas or propane system and FIG. 12 shows the electrical system which includes the feedback elements and electrical controls over the water, air and gas/propane systems. The computer unit 120 shown in FIGS. 2 and 12 is not shown in FIGS. 9, 10 and 11, but does exert control over these interrelated systems via power control lines running directly to the pumps, compressors or the like associated with these systems and/or through electrical communication with the solenoid valves 121–129 shown therein as parts of manifold 115.

First, in FIG. 9, water to be pumped into the drum assembly originates from a water reservoir 140 and is pumped via pump 141 through piping 142 to manifold 115. Computer 120 controls the opening and closing of solenoids 121A, 121B for the initial infeed of water to the water dispersion portion of the composting system. When open, solenoid 121A provides water flow to the preheat coil 143 disposed within axle 50. Coil 143 is shown also in FIG. 1A Specifically, water thus flows through piping 142 and solenoid 121A, through piping 144 as this enters inlet end 113 of axle 50, and then flows through coil 143 and returns through return piping 145 to exit back out of axle 50. The water then travels down into coil 146 of heater 76. Heated water would then emerge from heater 76 flowing in piping 147 back to manifold 115. In the preferred embodiment, three separate solenoids 123A, 123B and 123C are used to direct flow of water heated as just described to three separate inlet 96 (such as those shown and described relative to FIGS. 6, 6B, 6C and 6D above). Each distinct solenoid 123A, 123B and 123C would then preferably be linked to a respective distinct dispenser 96. In the preferred embodiment, solenoids 123A, 123B and 123C would then be linked to the first, third and fifth dispensers 96 (counting from right to left in FIG. 1) as described above. Water would then flow through respective tubes 112A, 112B or 112C to the selected first, third or fifth dispenser 96. Computer 120 also controls the opening and closing of solenoids 123A, 123B and 123C. Thus, only one, two or all three may be opened or closed at a time depending on the need perceived by computer 120 which is, in turn, dependent on the feedback data received from the various sensors to be described further below.

Note, although not shown, it is preferred to have all water (and air) piping insulated. This is particularly true for the post-heater pipes 145, 147 and 112A–C. This provides for better heat retention by the fluids flowing through the pipes to increase efficiency of use in all weather conditions.

FIG. 9 also shows the use of a solenoid 121B as a bypass of internal heating coil 143 such that water from reservoir 140 may be directed straight to heater 76 via piping 148 to flow down through heater coil 146 to emerge therefrom through piping 147 as described above. The heated water would then travel to, and a directed by computer recognized need through respective solenoids 123A, 123B and 123C to the respective first, third and/or fifth dispensers 96.

A still further solenoid 122 is shown in FIG. 9 as connected by inlet piping 142 to water reservoir 140. Water exiting from solenoid 122 bypasses both heating systems (coils 143 and 146) to flow through piping 149 directly into inlet tubes 112A, 112B and/or 112C and thus directly to dispensers 96. This then provides a source of unheated water to be dispersed into the composting mass. This is particularly useful when conditions approach the point of combustion.

Next, FIG. 10 shows how the computer controlled manifold 115 directs air flow into the composting system. As shown, air from an air reservoir 150 would be forced therefrom by an air compressor 151 into piping 152 flowing toward manifold 115. Several branches of piping 152 lead to several respective solenoids identified generally by numerals 124 (A and B), 125 (A,B and C), 126, and 127 (A and B) within manifold 115. As with the water system of FIG. 9 described above, a primary piping line 144 through solenoid 124A runs to the inlet 113 of axle 50 and runs to a preheat coil 143 through piping 144 disposed centrally in axle 50. Note, the same preheat coil 143 through piping 144 described as being used for both the water and air systems even though separate coils could and/or might foreseeably be used. Indeed, totally separate plumbing and piping systems or the identical, same plumbing and piping systems can be foreseeably used for both the heated air and water flowing not only to, in and through coil 143, but also through the piping 145, 146, 147 and 148 through heater 76 and/or through the piping 112A, 112B and/or 112C flowing into and through dispensers 96. However, at least two distinctions between the air and water systems appear in the preferred embodiment. First, a further piping line 154 from solenoid 124B in manifold 115 may optionally be run either to inlet end 113 or discharge end 155 (as shown) of axle 50 to provide a source of unheated air to shrouded vents (not shown) disposed in the axle to cool the mass of compost material surrounding axle 50. Second, in the preferred embodiment, three separate piping lines 156A, 156B, and 156C are show n emanating from solenoids 125A, 125B and 125C in the manifold 115 to provide a direct flow of unheated air to the three air inlet piping lines 112A–C to the three distinct dispensers 96 within axle 50 as described for the water dispensing above. The three separate lines 156A, 156B, and 156C may likewise be operated separately, two at a time or simultaneously via computer control of the three corresponding solenoid valves 125A, 125B and 125C.

FIG. 11 shows a propane system which is also controllable by computer 120 via valves in manifold 115. The primary purpose of the propane system is to provide a fuel for burning in heater 76. Computer control of this would, for example, be through the control of solenoid 128 which governs the flow of propane from propane tank 160 through piping 162 to piping 164. Computer opening of solenoid 128 would provide for outflow through piping 164 to burner 165 of heater 76. An optional bypass piping line 166 (shown partially in dashed lines) is also shown which allows for alternative external, non-computer control of propane feeding to heater 76. Other optional attachments to propane source 160 are also shown in FIG. 11. Propane could be the fuel source for the chain-drive engine 170 used to drive vessel 55, and/or it could be used to drive the compressor engine 172 and/or the generator engine 174. A dashed piping line 168 is shown to indicate the option of using a manifold solenoid 129 to control propane flow to any of these other, optional engines, as shown by this example, to the chain-drive engine 170. Such connections could also be used to connect the propane source 160 to the compressor and generator engines 172, 174 as well. Note that although propane is described in the preferred embodiment, other fuels may also be used herewith such as natural gas, gasoline or diesel, for example (though possibly and/or necessarily also incorporating other structural modifications for use thereof).

Also, as an alternative to the optional propane fueling of engines 170, 172 and 174, a hydraulic drive system could be used as well as for powering the water pump 141. Moreover, as will be described further below, these devices could alternatively be electrically powered.

FIG. 12 shows the electrical connections from computer 120 to all of the other computer-controlled parts of the composting system for ultimate control thereover. Primary control is illustrated by the individual connections 180, 181, 182 and the like (not shown), running between computer 120 and each of the plurality of manifold solenoids 121, 122, 123 and the like (not shown). Connections 180, 181 and 182 are exemplary of the plurality of computer connections wired individually to each of the manifold solenoids. By these connections, computer 120 energizes and de-energizes the respective solenoids to open and close the valves to allow the passage of air, water, propane and/or other desirable fluids (as mentioned above) to be passed therethrough.

The ultimate solenoid control decisions made by computer 120 are dependent on data received as feedback from one or more sensors disposed in the composting system. For example, a temperature sensor 184 is disposed (here schematically) inside axle 50 near coil 143 in the central portion of axle 50. This sensor 184 provides temperature data collected from its location at or near the center of the entire mass of composting material. A composting mass should reach its highest temperature at or near this point so temperature data received from sensor 184 would provide significant information for the computer to use in determining whether and how much air or water and/or heat or cooling would need to be injected into the system. Two other sensors 98A and 98B are also shown schematically relative to axle 50; however, these are preferably disposed on dispensing plow blades 96 as shown and described above. For purposes of this portion of the description, dispensers 96A and 96B are referred to in FIG. 12 and these are intended to correspond to the preferred embodiment second and fourth dispensers shown and described relative to FIG. 1 above. Sensors 98A and 98B are intended to be disposed in the flow of compost material in order to provide more direct information as to the relative temperatures and or moisture content thereof. This data is to also be used by computer 120 in determining whether and which dispensers 96 should be activated to give more spot control of heat, aeration and moisture. Thus, sensors 98A and 98B are intended to be sensitive to temperature and moisture which means including a plurality of sensors on the respective dispensing plows 96A and 96B. Thus, for example, plow 96A as shown in FIG. 12 could be fitted with one or a plurality of sensors, each sensor being sensitive to either temperature or moisture or both. Two other sensors are also shown in FIG. 12; one, sensor 186, for sensing the outlet heated temperature of the air and/or water line from heater 76, and the other, sensor 188, for sensing ambient temperature. These also will provide information useful to the computer in determining whether and which dispensers should be activated to inject heated or unheated air and/or water into the composting system.

FIG. 12 also shows computer connections to several other components of the composting apparatus of the present invention. Many of these connections are optional. For example, an optional computer connection is shown to a valve 190 indicating an optional computer control for fuel supply to heater 76. A computer connection to an igniter or other heating element control (not shown) at heater 76 could also be included. Respective connections 191, 192, 193, and 194 are also shown between the computer and the power units of the water pump 195, compressor motor 196, generator motor 197, and chain-drive motor 90 for driving vessel 55. Thus, the computer could be made to control the starting and stopping of all of these devices depending on the needs presented by the composting materials in striving for optimum composting conditions. Perhaps, speed, pressure or flow controls at the devices themselves could also be controlled by computer 120 as well. Thus, for example, perhaps a rotation speed control could be communicated by computer 120 to chain-drive motor 90 via connection 194. Compressor or pump pressure and/or flow control for air and water flows may also foreseeably be controlled by the computer communicating with the source as well.

Computer 120 is foreseeably powered either by an external source 200 or by a battery 201 which, in turn, may be rechargeable by generator 175. External power could also be used to power the other devices described thus far; or they could also be powered by generator 175.

Manufacture of a composting apparatus 20 of the present invention is intended to involve fairly conventional assembly techniques and materials. Specifically, rotatable drum 55 is preferably made from a section of corrugated culvert (such as 10 gauge galvanized steel from the Pacific Corrugated Pipe Company, Casa Grande, Ariz.) which is inserted in outer drum 56 (which is preferably made from 12 gauge corrugated pipe, also from the Pacific Corrugated Pipe Company). Manufacturer's specifications for such sizing of a drum 55 include 120° cradle support for every eighteen feet of length of drum 55. This is preferably supplied by supports 130. Before insertion in drum 55, metal, substantially hollow axle 50 preferably has pre-attached thereto one or more dispensers 96 by, for example, welding or bolting. Piping 112 are also preferably connected to piping connections 110 prior to complete assembly of drum assembly 24. One or more bearing members 101 and/or 104 are also preferably fitted on and about axle 50 previous to fixing axle 50 in drum assembly 24. Then, when axle 50 is axially disposed in drum 55, strippers 100 and/or 102 can be bolted into place, affixed to interior drum surface 105. Feed vane 106 may then be (or previously) be fixed in place, again by bolting. Preferably, no welds are used on any of the interior or galvanized surfaces. Moreover, bolts are preferred on all interior connections for maintenance purposes. Feed vane 106 will be bolted to the interior surface 105 of drum 55. So too are strippers 100 bolted to the interior surface 105 of drum 55.

In operation, once drum 55 and feed hopper 30 are charged with raw compost material, the composting process can run continuously. At the start, the feed operation is performed manually and then computer 120 takes over. Computer 120 relies on sensors 98 within drum 55 to control the operation. Sensors 98 will initially sense that there is no temperature above ambient and no air pressure. Also, a red warning light will initially flash indicating that apparatus 20 needs water. Computer 120 also controls the initiation of the generator to run the drive motor, pump and compressor. Motor 90 turns drum 55. The air compressor and water pump are signalled by computer 120 to pressure up to 1500 PSI. Computer 120 also signals the propane water heater to heat up to 180° F. When the computer senses 1500 PSI and 180° F. the generator shuts off and computer 120 gives the "stand by" signal. The human operator then loads infeed hopper 30 until it is full. Six to eight yards of raw compostable material will gravity feed into the inside of hopper 30. When hopper 30 is full, the human operator initiates the actual computer-controlled "operation." The human operator continues to have responsibility for maintaining a full gas level in the generator, propane in the propane tank, water in the water receiver and raw compostable material in feed hopper 30. Computer 120 initiates drive motor 90 to rotate drum 55 at a pre-determined initial rate for approximately five minutes. Computer 120 simultaneously initiates the injection of 180° F. water. The entire system then stops all actions and sits stagnant for about an hour. Sensors 98 determine moisture content and temperatures at various locations throughout the interior of drum 55. Computer 120 now adjusts according to temperature and moisture. If the moisture content is proper but the temperature is too high computer 120 controls the air system to inject pressurized air. If the temperature is low and the moisture is low, then computer 120 causes the injection of hot water. If raw material is too moist but not hot enough, then computer 120 will dispense (circulate) hot air through the stationary dispensers. The dispensers 96 are angled toward outlet end 28 of drum 55 to feed raw material toward discharge hopper 32. Computer 120 receives further feedback from sensors 98 initiate whatever action is needed to maintain both optimum temperature and optimum moisture for the composting process. The controlled environment inside drum 55 is unaffected by weather or ambient temperatures. The material continues to move as material from intake hopper 30 is fed into the system. In approximately one week discharge hopper 32 will start to fill as feed vane 106 moves the processed material out discharge opening 62/64 of drum assembly 24. The infeed bin 30 must be kept full when the discharge bin 32 is full. The compost can then be scooped out of discharge hopper 32 with a loader or augured out with an auger attachment such as auger 86.

Note, as mentioned above, a 5° tilt is preferably imparted to composter 20 such that the discharge end 28 of drum assembly 24 is elevated relative to infeed end 26. The purpose of this is to help maintain a full capacity of compost materials within drum 55 during operation. The compost material is lifted and moved upward toward the discharge end 28 by feed vane 106.

For maintenance purposes, most parts are preferably bolted together for simple removal so that interior parts may be easily accessed, fixed and/or replaced. The 180° out of phase relationship of half-moon openings 62, 63 in inner drum 55 provides for continuous access into drum 55 for this purpose because at all times either opening 62 or 63 is at least in partial alignment with the corresponding openings 64, 65 in outer drum 56.

In an alternative embodiment, a closed system of circulating water or heat pipes (not shown) would also be incorporated into the composting apparatus of the present invention. During the composting process, the temperature rises most in the center of the mass to, for example, 170–180 degrees in core. Thus, a system is needed to convey or transfer heat from the core outward to bring the temperature of the biomass toward equilibrium from the core to the exterior portions of the biomass near the interior surface of drum 55. Thus, a closed system of circulating water flowing from inside axle 50 through a closed pipe system (not shown) attached for example to a dispenser 96, out toward the exterior portions of the mass of composting materials. This water flowing will absorb heat at or near the core and in theory transfer it out to the lower temperature mass by convention. The closed system of water flow would then require a return line, preferably insulated to the axle and then probably out to an external cooler (not shown) before returning to the interior of drum 55. A closed system heat pipe would work in much the same way except for not needing to force a circulation of fluid in and probably out to an external cooler. The heat pipe will be effective to transfer heat along the length of the heat pipe without the need for external circulating forces.

In an alternative embodiment, the chassis 22 may be fixed in place without wheels 34, 36. Thus, it may be understood that the invention may be practiced without the transportability feature provided by a wheeled chassis 22. Also, though a 5° tilt created by support jack 38 is described as preferred, jack 38 (or other support means) may be made variable to vary the pitch of chassis 22 to various other angles depending on the operator desired parameters.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. An automated composting apparatus comprising:
   a chassis having disposed thereon first and second support members, said first support member having a first axle mount attached thereto and said second support member having a second axle mount attached thereto;

a rotatable drum having a stationary axle disposed therethrough, said rotatable drum being rotatably disposed relative to said stationary axle to rotate thereabout, said stationary axle being attached to said first and second axle mounts of said first and second support members;

a plurality of dispensers mounted on said stationary axle and disposed within said rotatable drum, said sensors being capable of sensing heat, aeration, or moisture or any combination thereof, each said dispenser having a tubular connection member connected to a separate corresponding valve, each separate valve being connected via separate piping to a fluid supply source; whereby each said dispenser is adapted to individually disperse a fluidic substance from said fluid supply source into said rotatable drum; and a feedback control system having a plurality of sensors disposed inside said rotatable drum; whereby said feedback control system is connected to each said separate valve to selectively and separately control the flow of said fluidic substance from said fluid supply source selectively through each said separate valve responsive to data obtained by each of said plurality of sensors.

2. An automated composting apparatus according to claim 1 which further comprises a sensor support member which is mounted on said stationary axle and on which said sensor is mounted.

3. An automated composting apparatus according to claim 1 in which said fluidic substance is air.

4. An automated composting apparatus according to claim 1 in which said fluidic substance is water.

5. An automated composting apparatus according to claim 1 which further comprises a heater for preheating said fluidic substance.

6. An automated composter according to claim 5 in which said heater comprises a coil of tubing disposed in a hollow portion of said axle.

7. An automated composter according to claim 5 in which said heater comprises a coil of tubing disposed above a burner.

8. An automated composter according to claim 1 in which said feedback control system comprises computer circuitry.

9. An automated composter according to claim 1 which further comprises a semi-spiralled feed vane attached to the interior wall of said rotatable drum.

10. An automated composter according to claim 1 which further comprises an elongated stripper element having first and second ends, said stripper element being affixed at said first end to the interior surface of said rotatable drum and which is attached at its second end to a rotatable bearing member which is disposed in operable relationship on said axles.

11. An automated composter according to claim 1 which further comprises an elongated stripper implement having a plurality of stripper elements, each of said stripper elements having first and second ends, each of said stripper elements being affixed at said first end to the interior surface of said rotatable drum and each of said stripper elements being attached at each said second end to a rotatable bearing member which is disposed in operable relationship on said axles.

12. An automated composting apparatus according to claim 1 which further comprises an elevating mechanism attached to said chassis, said elevating mechanism being adaptable to provide a 5° tilt to said composting apparatus.

13. An automated composting apparatus according to claim 1 in which said rotating drum further includes end plates attached to each end of said rotating drum, each end plate having a half-moon shaped opening disposed therein for infeed of compostable materials at one end of said rotating drum and discharge of finished compost at the other end of said rotating drum.

14. An automated composting apparatus according to claim 13 which further comprises an external stationary drum in which said rotating drum is disposed, said stationary drum having end plates, attached one at each end of said stationary drum, said end plates each having a half-moon shaped opening for infeed of compostable materials at one end of said rotating drum and discharge of finished compost at the other end of said rotating drum.

15. An automated composting apparatus comprising:

a chassis having disposed thereon first and second support members, said first support member having a first axle mount attached thereto and said second support member having a second axle mount attached thereto;

a rotatable drum having, a stationary axle disposed therethrough, said rotatable drum being rotatable disposed relative to said stationary axle to rotate thereabout, said stationary axle being attached to said first and second axle mounts of said first and second support members;

a dispenser mounted on said stationary axle and disposed within said rotatable drum, said sensors being capable of sensing heat, aeration, or moisture or any combination thereof, said dispenser having a tubular connection member connected to a valve which is connected via piping to a fluid supply source; whereby said dispenser is adapted to disperse a fluidic substance from said fluid supply source into said rotatable drum;

a feedback control system having a sensor disposed inside said rotatable drum; said feedback control system being connected to said valve to control the flow of said fluidic substance from said fluid supply source through said valve;

end plates attached to each end of said rotating drum, each end plate having a half-moon shaped opening disposed therein for infeed of compostable materials at one end of said rotating drum and discharge of finished compost at the other end of said rotating drum; and, an external stationary drum in which said rotating drum is disposed, said stationary drum having end plates, attached one at each end of said stationary drum, said end plates each having a half-moon shaped opening for infeed of compostable materials at one end of said rotating drum and discharge of finished compost at the other end of said rotating drum.

16. An automated composting apparatus comprising:

a wheeled chassis having a first support plate with a front axle mount and a second support plate with a rear axle mount disposed thereon;

a rotatable drum having a stationary axle disposed therethrough, said rotatable drum being rotatably connected to said stationary axle to rotate thereabout, said stationary axle being mounted on said front and rear axle mounts of said first and second support plates;

a plurality of dispensers disposed within said rotatable drum each of said plurality of dispensers being mounted on said stationary axle, each said dispenser being connected to a separate valve, each separate valve being connected to a fluid supply line;

whereby each said dispenser is individually adapted to disperse at least one fluidic substance into said rotatable drum, said sensors being capable of sensing heat, aeration, or moisture or any combination thereof;

a feedback control system having a plurality of sensors disposed inside said rotatable drum; said feedback control system being connected to each said valve to selectively and separately control the flow of said at least one fluidic substance from said fluid supply line separately through each said valve said feedback control system controlling each said valve responsive to compost condition data obtained by each of said plurality of sensors said automated composting apparatus further including a heater for preheating each of said at least one fluidic substances;

a semi-spiralled feed vane attached to the interior wall of said rotatable drum;

an elongated stripper element having first and second ends, said stripper element being affixed at said first end to the interior surface of said rotatable drum and which is attached at its second end to a rotatable bearing member which is disposed in operable relationship on said axle; and an elevating mechanism attached to said wheeled chassis, said elevating mechanism being adaptable to provide a 5° tilt to said automated composting apparatus.

17. An automated composting apparatus according to claim 16 in which said at least one fluidic substance is water.

18. An automated composting apparatus according to claim 17 in which said at least one fluidic substance also includes air.

19. An automated composting apparatus according to claim 16 in which said rotatable drum further includes end plates attached to each end of said rotatable drum, each end plate having a half-moon shaped opening disposed therein for infeed of compostable materials at one end of said rotatable drum and discharge of finished compost at the other end of said rotatable drum.

20. An automated composting apparatus according to claim 19 which further comprises an external stationary drum in which said rotatable drum is disposed, said stationary drum having end plates, attached one at each end of said stationary drum, said end plates each having a half-moon shaped opening for infeed of compostable materials at one end of said rotatable drum and discharge of finished compost at the other end of said rotatable drum.

* * * * *